(12) United States Patent
Lee et al.

(10) Patent No.: US 7,884,536 B2
(45) Date of Patent: Feb. 8, 2011

(54) LIGHT EMISSION DEVICE AND DISPLAY HAVING THE LIGHT EMISSION DEVICE

(75) Inventors: Sang-Jin Lee, Yongin-si (KR); Kyung-Sun Ryu, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 620 days.

(21) Appl. No.: 11/759,845

(22) Filed: Jun. 7, 2007

(65) Prior Publication Data

US 2007/0284998 A1   Dec. 13, 2007

(30) Foreign Application Priority Data

Jun. 8, 2006   (KR) .................... 10-2006-0051478
Nov. 14, 2006   (KR) .................... 10-2006-0112201

(51) Int. Cl.
  *H01J 1/304*   (2006.01)
  *H01J 1/54*   (2006.01)
(52) U.S. Cl. .................... 313/495; 313/496; 313/497; 445/23; 445/24; 445/25
(58) Field of Classification Search ......... 313/495–498; 445/23–25
See application file for complete search history.

(56) References Cited

U.S. PATENT DOCUMENTS

| | | | | |
|---|---|---|---|---|
| 5,971,566 | A | * | 10/1999 | Tani et al. .................... 362/294 |
| 6,778,234 | B2 | * | 8/2004 | Park et al. .................... 349/62 |
| 2004/0057226 | A1 | | 3/2004 | Berthou et al. |
| 2004/0147049 | A1 | * | 7/2004 | Lee et al. .................... 438/20 |
| 2004/0228110 | A1 | | 11/2004 | Hsieh et al. |
| 2005/0275766 | A1 | * | 12/2005 | Liu et al. .................... 349/64 |
| 2008/0093973 | A1 | * | 4/2008 | Jung et al. .................... 313/495 |

FOREIGN PATENT DOCUMENTS

| | | |
|---|---|---|
| CN | 1608326 A | 4/2005 |
| CN | 1637511 A | 7/2005 |
| EP | 0 550 047 A2 | 7/1993 |
| EP | 1 134 609 A2 | 9/2001 |
| EP | 1 858 057 A2 | 11/2007 |
| JP | 56-145078 U | 11/1981 |
| JP | 59-044027 | 3/1984 |
| JP | 62-059923 | 3/1987 |

(Continued)

OTHER PUBLICATIONS

Search Report dated Jan. 14, 2008, for corresponding European Patent Application No. 07109845.3, indicating the relevance of the cited references.

(Continued)

*Primary Examiner*—Bumsuk Won
*Assistant Examiner*—Nathaniel J Lee
(74) *Attorney, Agent, or Firm*—Christie, Parker & Hale, LLP

(57) ABSTRACT

A light emission device and a display having the light emission device are provided. The light emission device includes a light emission panel for emitting light, a diffuser plate facing the light emission panel to diffuse the light emitted from the light emission panel, and a heat dissipation plate disposed between the light emission panel and the diffuser plate.

16 Claims, 12 Drawing Sheets

FOREIGN PATENT DOCUMENTS

| | | |
|---|---|---|
| JP | 63-187123 U | 11/1988 |
| JP | 63-194326 U | 12/1988 |
| JP | 64-29625 U | 2/1989 |
| JP | 09-190782 | 7/1997 |
| JP | 11-064820 | 3/1999 |
| JP | 2000-011958 | 1/2000 |
| JP | 2001-265235 | 9/2001 |
| JP | 2004-302321 | 10/2004 |
| JP | 2005-084491 | 3/2005 |
| JP | 2005-275105 | 10/2005 |

OTHER PUBLICATIONS

SIPO Patent Gazette Publication No. CN 101150900 (Nov. 17, 2010).

* cited by examiner

LIGHT EMISSION DEVICE AND DISPLAY HAVING THE LIGHT EMISSION DEVICE

CROSS-REFERENCES TO RELATED APPLICATIONS

This application claims priority to and the benefit of Korean Patent Application No. 10-2006-0051478, filed in the Korean Intellectual Property Office on Jun. 8, 2006, and No. 10-2006-0112201, filed in the Korean Intellectual Property Office on Nov. 14, 2006, the entire contents of which are incorporated herein by reference.

BACKGROUND OF THE INVENTION

1. Field of the Invention

The present invention relates to a light emission device and a display having the light emission device. More particularly, the present invention relates to a light emission device having a heat dissipation structure and a display having the light emission device.

2. Description of the Related Art

A field emitter array (FEA) type of electron emission element is an electron emission element that includes one or more electron emission regions, and driving electrodes (e.g., cathode and gate electrodes) for controlling electron emission of the electron emission regions. In one embodiment, the electron emission regions are formed into structures having sharp tips and utilize a material having a relatively low work function or a relatively large aspect ratio, such as molybdenum (Mo) and/or silicon (Si), or are formed from a carbon-based material such as carbon nanotubes, graphite, and diamond-carbon, so as to effectively emit electrons when an electric field is formed around the electron emission regions under a vacuum atmosphere.

A plurality of the electron emission elements are arrayed on a first substrate to constitute an electron emission device. The electron emission device is combined with a second substrate, on which a light emission unit having phosphor layers and an anode electrode is formed, to constitute a light emission device.

In addition to functioning as a display, the light emission device with the above described structure may function as a light source for a passive (non-emissive) type of display device.

The above information disclosed in this Background section is only for enhancement of understanding of the background of the invention and therefore it may contain information that does not form the prior art that is already known in this country to a person of ordinary skill in the art.

SUMMARY OF THE INVENTION

Aspects of embodiments of the present invention are directed to a light emission device with improved heat dissipation efficiency, and a display having the light emission device.

In an exemplary embodiment of the present invention, a light emission device includes a light emission panel for emitting light, a diffuser plate facing the light emission panel to diffuse the light emitted from the light emission panel, and a heat dissipation plate disposed between the light emission panel and the diffuser plate.

In one embodiment, the light emission panel includes an active area for emitting the light and a non-active area around the active area, wherein the heat dissipation plate is located at the non-active area. The heat dissipation plate may have a close-curve around the active area. The heat dissipation plate may include a base for contacting the light emission panel and a plurality of heat dissipation fins arranged on the base and spaced apart from each other.

In one embodiment, the light emission panel includes an active area for emitting the light and a non-active area around the active area, and the heat dissipation plate includes a pattern at the active area such that the light emitted from the light emission panel can pass through the heat dissipation plate. The heat dissipation plate may include a plurality of apertures through which the light emitted from the light emission panel can pass and a non-aperture portion by which the light emitted from the light emission panel is blocked, and, when an area occupied by the apertures in the active area is S1 and an area occupied by the non-aperture portion is S2, the following condition is satisfied:

$$1 \leq S1/S2 \leq 19.$$

The apertures may have a pitch within the active area. The apertures may be disposed to correspond to respective pixels of the light emission panel. The heat dissipation plate may have a stripe pattern or a mesh pattern. The heat dissipation plate may be a metal material deposited and patterned on the light emission panel (and/or may be a light emission plate).

In one embodiment, the heat dissipation plate includes a material selected from the group consisting of aluminum, silver, copper, platinum, and combinations thereof.

In one embodiment, the thickness of the heat dissipation plate ranges from 0.05 to 10 nm.

In one embodiment, the heat dissipation plate is a molded metal plate.

In one embodiment, the light emission panel includes a first substrate, a second substrate opposing the first substrate, a light emission unit on the second substrate to emit light, and an electron emission unit on the first substrate to emit electrons. The electron emission unit may include a cathode electrode on the first substrate, a plurality of electron emission regions electrically connected to the cathode electrode, and a gate electrode electrically insulated from the cathode electrode. The light emission unit may include a phosphor layer and an anode electrode on the second substrate, and the anode electrode may be adapted to be applied with a voltage ranging from 10 to 20 kV.

In another exemplary embodiment of the present invention, a display includes a display panel for displaying an image and a light emission device for providing light to the display panel. Here, the light emitting device includes a light emission panel for emitting light, a diffuser plate facing the light emission panel to diffuse the light emitted from the light emission panel, and a heat dissipation plate disposed between the light emission panel and the diffuser plate.

In one embodiment, the display panel includes a plurality of first pixels arranged in rows and columns, and the light emission device includes a plurality of second pixels arranged in rows and columns, and wherein the first pixels are greater in number than the second pixels. The light emission device may be configured to represent gray levels in gray scale ranging from 2 to 8 bits for each pixel.

In one embodiment, the light emission unit includes a phosphor layer and an anode electrode on the second substrate, and the phosphor layer is a white phosphor layer.

DETAILED DESCRIPTION OF THE EMBODIMENTS

Figure 1:
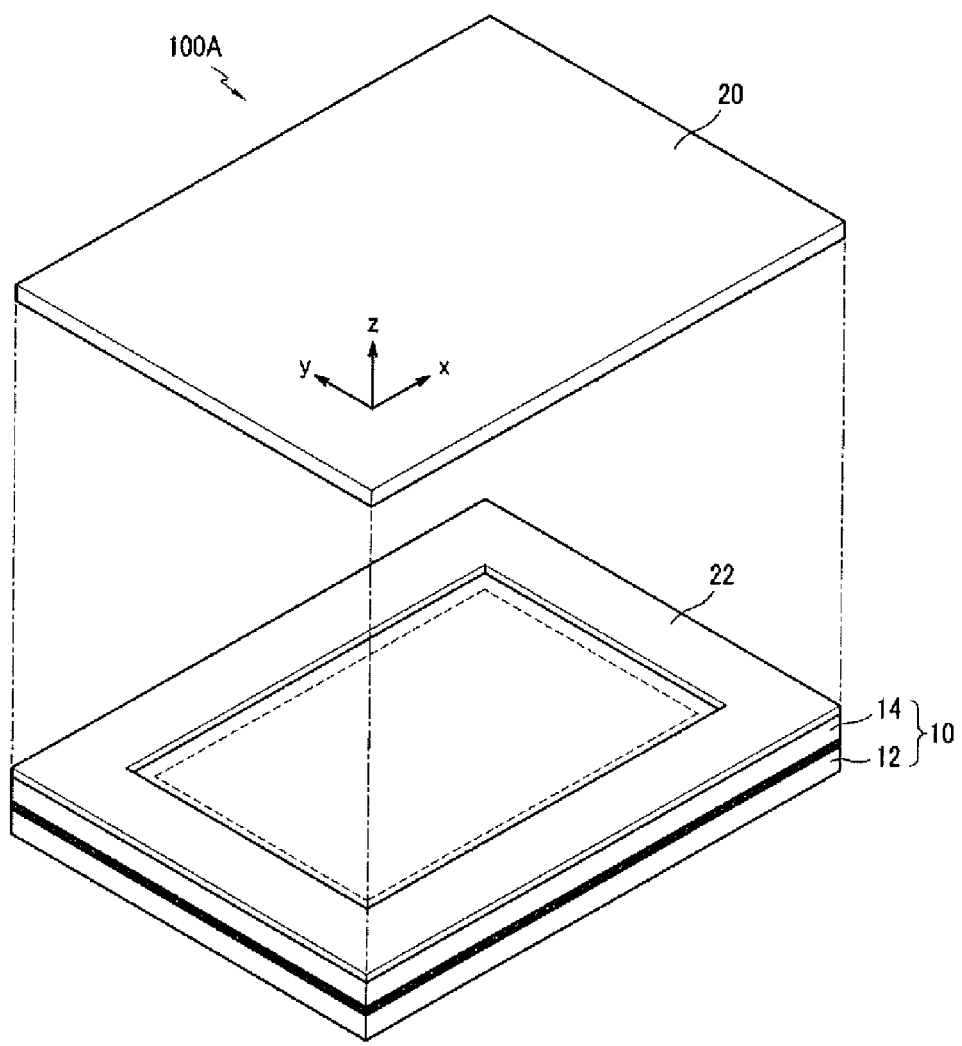
FIG. 1 is an exploded perspective schematic view of a light emission device according to a first exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Hereinafter, like reference numerals refer to like elements.

In exemplary embodiments of the present invention, devices that can emit light to an external side are regarded as light emission devices. Therefore, all displays that can transmit information by displaying symbols, letters, numbers, and images may be regarded as the light emission devices. In addition, a light emission device may be used as a light emission panel for emitting light to a passive-type display panel (or a non-emissive display panel). A panel may be a planar panel, a rounded panel, or other types of panels.

FIG. 1 is a schematic exploded perspective schematic view of a light emission device according to a first exemplary embodiment of the present invention.

Referring to FIG. 1, a light emission device 100A includes a light emission panel 10, a diffuser plate 20, and a heat dissipation plate 22.

The light emission panel 10 is a surface (or area) light emission-type panel, and it radiates light by exciting a phosphor layer that is deposited over an area that may be predetermined. The light emission panel 10 includes a first substrate 12, a second substrate 14, an electron emission unit (110 in FIG. 2), and a light emission unit (120 in FIG. 2). In the present exemplary embodiment, the light emission panel 10 radiates light through electron emission.

The diffuser plate 20 is located above the light emission panel 10 to diffuse the light radiated from the light emission panel 10.

The heat dissipation plate 22 is disposed between the light emission panel 10 and the diffuser plate 20 to dissipate heat to an external side of the heat dissipation plate 22 (or to dissipate heat out of the light emission device 100A).

Figure 2:
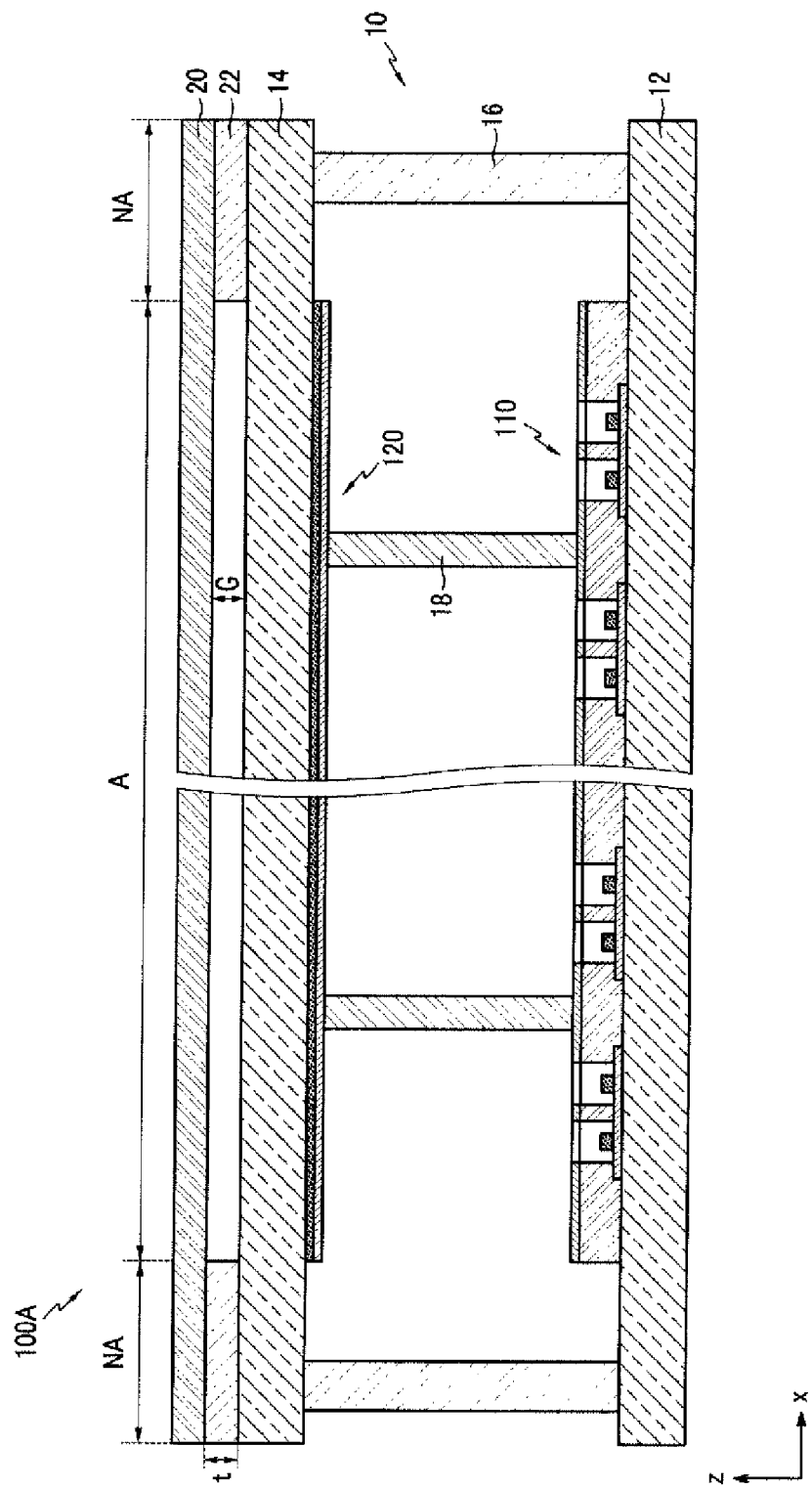
FIG. 2 is a partial sectional view of the light emission device of FIG. 1.

FIG. 2 is an enlarged sectional view of the light emission device of FIG. 1.

Referring to FIG. 2, the light emission panel 10 includes the first and second substrates 12 and 14 provided opposing one another in a substantially parallel manner with a gap (or predetermined gap) therebetween. A sealing member 16 is provided between the first and second substrates 12 and 14 along edge portions thereof to seal the first and second substrates 12 and 14 together to thus form a vessel having an inner space. The inner space of the vessel is exhausted to be kept at a degree of vacuum of about $10^{-6}$ Torr.

An electron emission unit 110 formed of an array of electron emission elements is provided on a surface of the first substrate 12 facing the second substrate 14, and a light emission unit 120 including a phosphor layer (32 in FIG. 3) and an anode electrode (34 in FIG. 3) is provided on a surface of the second substrate 14 facing the first substrate 12. A plurality of spacers 18 are disposed between the first and second substrates 12 and 14 to resist atmospheric pressure applied to the vessel (or vacuum vessel) and to thereby ensure that the gap between the first and second substrates 12 and 14 is uniformly maintained.

The light emission panel 10 includes an active area A and a non-active area NA formed around the active area A. The heat dissipation plate 22 is located in the non-active area. For example, the heat dissipation plate 22 may be formed in a closed curve (or may be formed as a closed curve structure) around the active area A. In the active area A, a gap G (that may be predetermined) is defined between the light emission panel 10 and the diffuser plate 20 by the heat dissipation plate 22. In order to define the gap G, the heat dissipation plate 22 may have a thickness ranging from 0.05 to 10 mm. In one embodiment, when the thickness is less than 0.05 mm, the heat dissipation efficiency may be deteriorated due to the reduced thickness. In another embodiment, when the thickness is greater than 10 mm, a distance between the light emission panel 10 and the diffuser plate 20 is relatively high and thus the light transmittance may be deteriorated to cause an excessive amount of light loss.

Further, since the heat dissipation plate 22 is located only at the non-active area NA, the light radiated from the light emission unit 120 is not blocked by the heat dissipation plate 22. In another embodiment, however, when the heat dissipation plate 22 is formed of a transparent material, the heat dissipation plate 22 may be located at the active area A.

In order to effectively dissipate the heat generated from the light emission panel 10, the heat dissipation plate 22 may be formed of a metal or alloy that has a relatively high heat transfer coefficient (thermal conductivity). For example, the heat dissipation plate 22 may be formed of a material selected from the group consisting of aluminum (Al), silver (Ag), copper (Cu), platinum (Pt), and combinations thereof.

In addition, the diffuser plate 20 functions to diffuse the light emitted from the light emission unit 120 so that a luminance derivation between the non-active area the active area is minimized.

The light emission panel having the above-described structure may be applied to a variety of different types of electron emission displays, such as an FEA-type (Field Emitter Array-type) of electron emission display, a SCE-type (Surface-Conduction-Emission-type) of electron emission display, a MIM-type (Metal-Insulator-Metal-type) of electron emission display, and a MIS-type (Metal-Insulator-Semiconductor-type) of electron emission display. In the following description, an FEA-type light emission panel will be described in more detail below by way of example.

Figure 3:
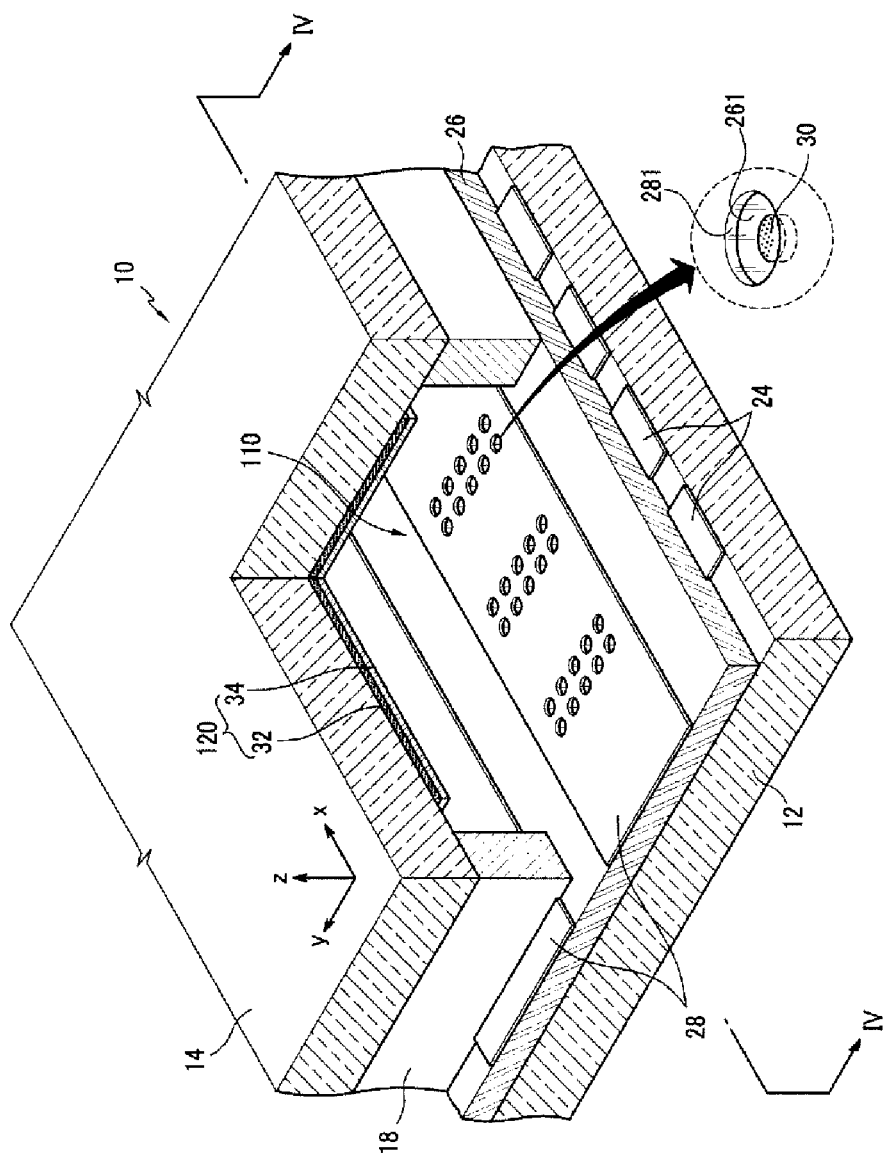
FIG. 3 is a partially cut-away perspective view of a light emission panel of FIG. 1.

FIG. 3 is a sectional view of the light emission panel 10 of FIG. 1, illustrating an internal structure of the light emission panel 10.

Referring to FIG. 3, cathode electrodes 24 are formed on the first substrate 12 in a stripe pattern extending in a y-direction. A first insulation layer 26 is formed on the first substrate 12 while covering the cathode electrodes 24. Gate electrodes 28 are formed on the first insulation layer 26 in a stripe pattern extending in an x-direction crossing (or perpendicular to) the cathode electrodes 24.

With this configuration, crossing regions are formed by the crossings of the cathode electrodes 24 and the gate electrodes 28. Each of the crossing regions forms a unit pixel of the light emission panel 10. A plurality of electron emission regions 30 are formed on the cathode electrodes 24 at each of the unit pixels.

The electron emission regions 30 disposed in the above configuration are formed of a material that emits electrons when an electric filed is applied thereto under a vacuum atmosphere, such as a carbon-based material and/or a nanometer-sized material. In one embodiment, the electron emission regions 30 may be formed of carbon nanotubes, graphite, graphite nanofibers, diamond, diamond-like carbon, fullerene ($C_{60}$), silicon nanowires, or combinations thereof. Alternatively, the electron emission regions 30 may be formed of a molybdenum-based (Mo-based) material and/or a silicon-based (Si-based) material. In this case, the electron emission regions 30 may be formed to have a sharp tip structure.

First openings 261 and second openings 281 are respectively formed on the first insulation layer 26 and the gate electrodes 28 to expose the electron emission regions 30 on the first substrate 12.

A phosphor layer 32 is formed on the surface of the second substrate 14 facing the first substrate 12. The phosphor layer 32 may be a white phosphor layer. The phosphor layer 32 may be formed on the entire active area of the second substrate 14, or may be formed in a pattern (or a predetermined pattern) in which one white phosphor layer is located corresponding to each of the unit pixels.

Alternatively, the phosphor layer 32 may be realized through a combination of red, green, and blue phosphor layers, in which case the phosphor layers are provided in a pattern (or a predetermined pattern) for each of the unit pixels. In this exemplary embodiment, the phosphor layer 32 is a white phosphor layer formed on the entire active region of the second substrate 14.

An anode electrode 34 is formed on the phosphor layer 32 and is made of a metal such as aluminum (Al). The anode electrode 34 receives an external high voltage (e.g., a voltage ranging from 10 to 20 kV) to maintain the phosphor layer 32 at a high electric potential state. Also, the anode electrode 34 can be used to improve the luminance; i.e., among portions of the visible light emitted from the phosphor layer 32, the portion of the visible light that is emitted from the phosphor layer 32 to the first substrate 12 can be reflected by the anode electrode 34 back toward the second substrate 14, thereby improving the luminance. Here, the phosphor layer 32 and the anode electrode 34 are layered in this order on the second substrate 14 such that the phosphor layer 32 is adjacent to the second substrate 14. Accordingly, since the anode electrode 34 does not interfere with (or block) the light emitted from the phosphor layer 32, the anode electrode 34 may be formed of an opaque metal having a high degree of electrical conductivity.

In an alternative embodiment, the positions of the phosphor layer and the anode electrode may be reversed. That is, in the case where the anode electrode is made of a transparent conductive material, such as indium tin oxide (ITO), the anode electrode may be disposed between the second substrate and the phosphor layer. In another alternative embodiment, the anode electrode may be realized through a structure in which a metal layer is formed on a transparent conductive layer.

Figure 4:
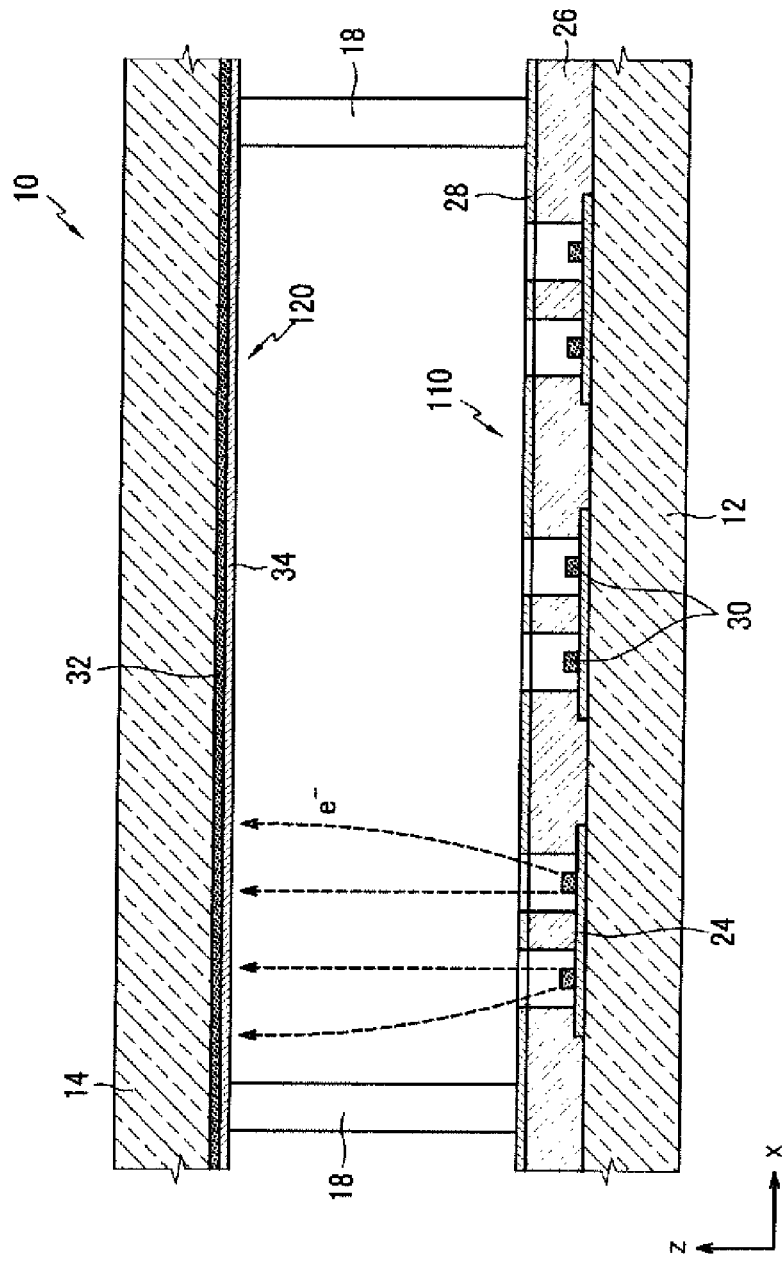
FIG. 4 is a sectional schematic view of the light emission panel taken along line IV-IV of FIG. 3.

FIG. 4 is a sectional view taken along line IV-IV of FIG. 3. The following description will describe an operation of the light emission panel 10 in more detail.

The light emission panel 10 forms a plurality of unit pixels by a combination of the cathode electrodes 24 and the gate electrodes 28, and is driven by external voltages (or predetermined external voltages) applied to the cathode electrodes 24, the gate electrodes 28, and the anode electrode 34. For example, the cathode electrodes 24 can function as scan electrodes for receiving a scan driving voltage, and the gate electrodes 28 can function as data electrodes for receiving a data voltage. Alternatively, the gate electrodes 28 can function as scan electrodes for receiving a scan driving voltage, and the cathode electrodes 24 can function as data electrodes for receiving a data voltage. Further, the anode electrode 34 receives a positive direct current voltage (ranging, for example, from 10 to 20 kV) that is required for the acceleration of electrons.

Then, electric fields are formed around the electron emission regions 30 at the unit pixels where a voltage difference between the cathode and gate electrodes 24 and 28 is equal to or greater than a threshold value so that electrons (e−) are emitted from the electron emission regions 30, as represented by the dotted lines in FIG. 4. The emitted electrons are attracted by the high voltage applied to the anode electrode 34 to thereby collide with corresponding areas of the phosphor layer 32 and excite the phosphor layer 32. Here, intensity of the light emitted from the phosphor layer 32 at each unit pixel corresponds to an amount of electrons emitted by electron beams of the corresponding pixel.

During the above-described driving process, heat generated from the electron emission unit 110 and the light emission unit 120 is dissipated to an external side through the heat dissipation plate 22 (see FIG. 2) that is in communication with (or contacts) external air (e.g., air outside of the panel).

The above-described light emission panel 10 is driven using less power than a light emitting diode (LED) type of light emission panel or a cold cathode fluorescent lamp (CCFL) type of light emission panel. Also, the light emission panel 30 allows the intensity of the light emission for each of the pixels to be independently controlled. Independent driving of the pixels is related to driving of a display panel that will be described below, and contributes to enhancing a dynamic contrast of images formed by the display panel.

Figure 5:
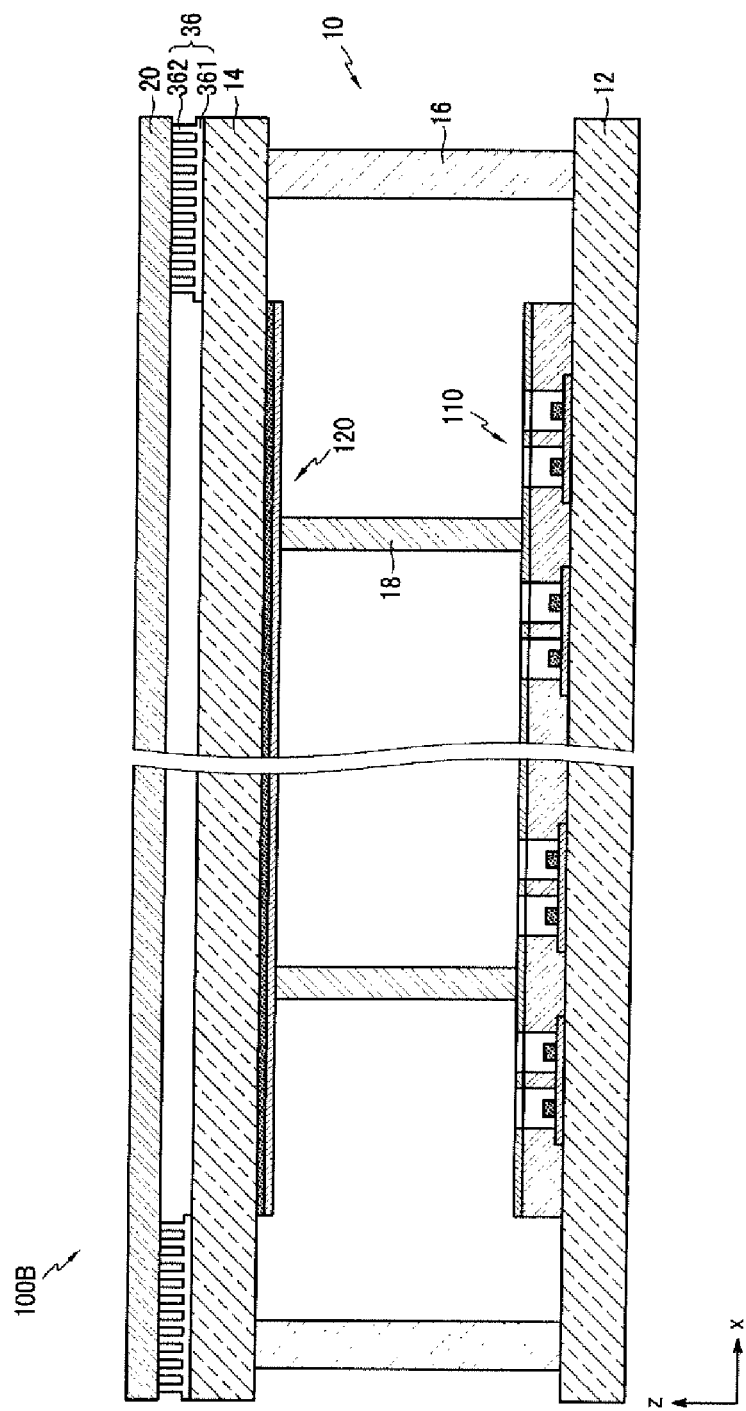
FIG. 5 is a partial sectional view of a light emission device according to a second exemplary embodiment of the present invention.

FIG. 5 is a sectional view of a light emission device according to a second exemplary embodiment of the present invention. For convenience, in FIGS. 5 and 2, like elements will be denoted by like reference numerals and a description thereof will not be provided again.

Referring to FIG. 5, a light emission device 100B of this exemplary embodiment includes a heat dissipation plate 36 that is formed with an uneven surface structure.

That is, the heat dissipation plate 36 includes a base 361 and a plurality of heat dissipating fins 362. The base 361 contacts the second substrate 14. The heat dissipation fins 362 are arranged on the base 361 and spaced apart from each other at certain (or predetermined) intervals. The heat dissipation fins 362 increase a contact (or surface) area with the external air to thereby improve the heat dissipation efficiency.

Figure 6:
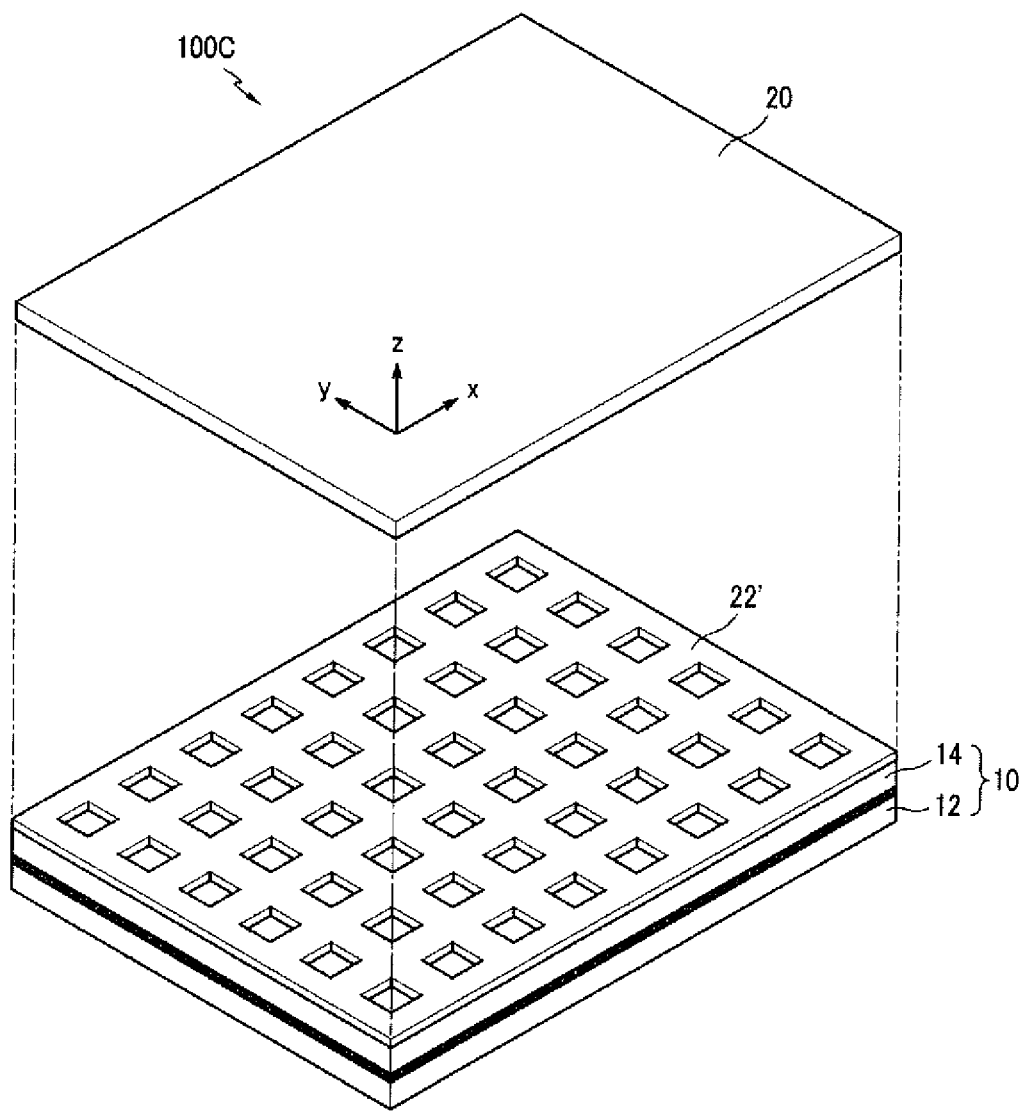
FIG. 6 is an exploded perspective schematic view of a light emission device according to a third exemplary embodiment of the present invention.

FIG. 6 is a schematic exploded perspective view of a light emission device according to a third exemplary embodiment of the present invention. For convenience, in FIGS. 1 and 6, like elements will be denoted by like reference numerals and a description thereof will not be provided again.

Referring to FIG. 6, a light emission device 100C of this exemplary embodiment includes a light emission panel 10, a diffuser plate 20, and a heat dissipation plate 22'. The heat dissipation plate 22' is formed with a certain (or predetermined) pattern.

Figure 7:
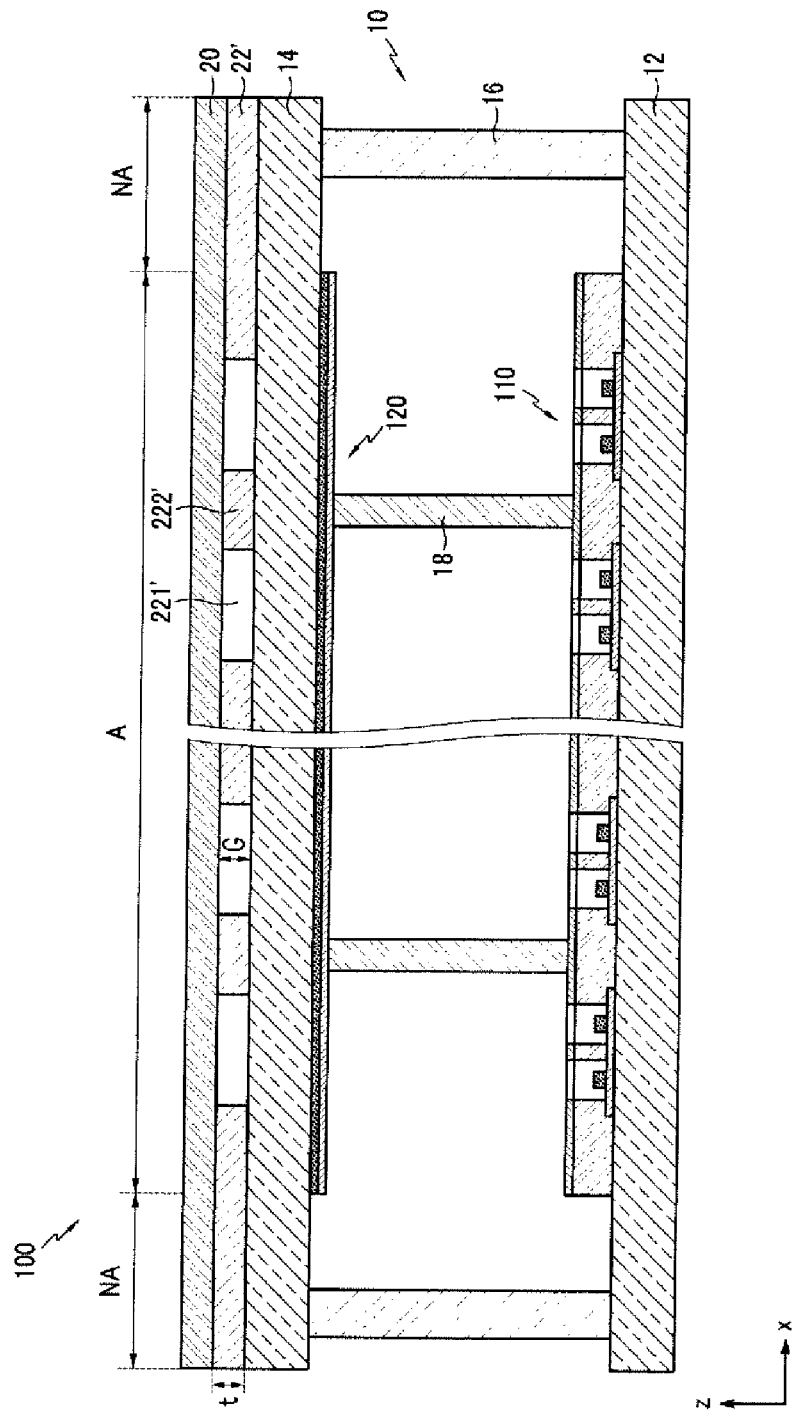
FIG. 7 is a partial sectional view of the light emission device of FIG. 6.

FIG. 7 is an enlarged sectional view of the light emission device of FIG. 6, illustrating an internal structure of the light emission device. As shown in FIG. 7, the heat dissipation plate 22' is patterned within an active area A such that it can allow the light emitted from the light emission panel 10 to pass therethrough. In more detail, the heat dissipation plate 22' includes a plurality of apertures 221' through which the light emitted from the light emission panel 10 passes and a non-aperture portion 222' by which the light emitted from the light emission panel 10 is blocked.

The apertures 221' are arranged with a certain (or predetermined) pitch in lines extending in an x-direction and columns extending in a y-direction. The apertures 221' may be formed in a regular arrangement or an irregular arrangement. When the apertures 221' are formed in the regular arrangement, the apertures 221' may be formed to correspond to the respective unit pixels. Also, when a black layer is formed on the light emission panel 10, the non-aperture portion 222' may be formed to correspond to the black layer.

In addition, when an area occupied by the apertures 221' in the active area A is S1 and an area occupied by the non-aperture portion 222' is S2, the following condition is satisfied:

$$1 \leq S1/S2 \leq 19.$$

When an area ratio (S1/S2) is 1, this means that an aperture ratio (a ratio of the aperture area to an area of the active area) is 50%. Further, when an area ratio is 19, this means that the aperture ratio is 95%. In one embodiment, when the area ratio is less than 1, the luminance of the light emission panel 10 may be reduced. In another embodiment, when the area ratio is greater than 19, the heat dissipation efficiency of the heat dissipation plate 22' may be deteriorated (or deteriorated too much).

According to this exemplary embodiment, even when the heat dissipation plate 22' is formed of an opaque material and disposed on the active area A, the light emitted from the light emission panel 10 can transmit through the heat dissipation plate 22' through the apertures 221'. Accordingly, the light emission device 100C can perform the heat dissipating operation while maintaining the proper (or normal) light emission function.

Figure 8:
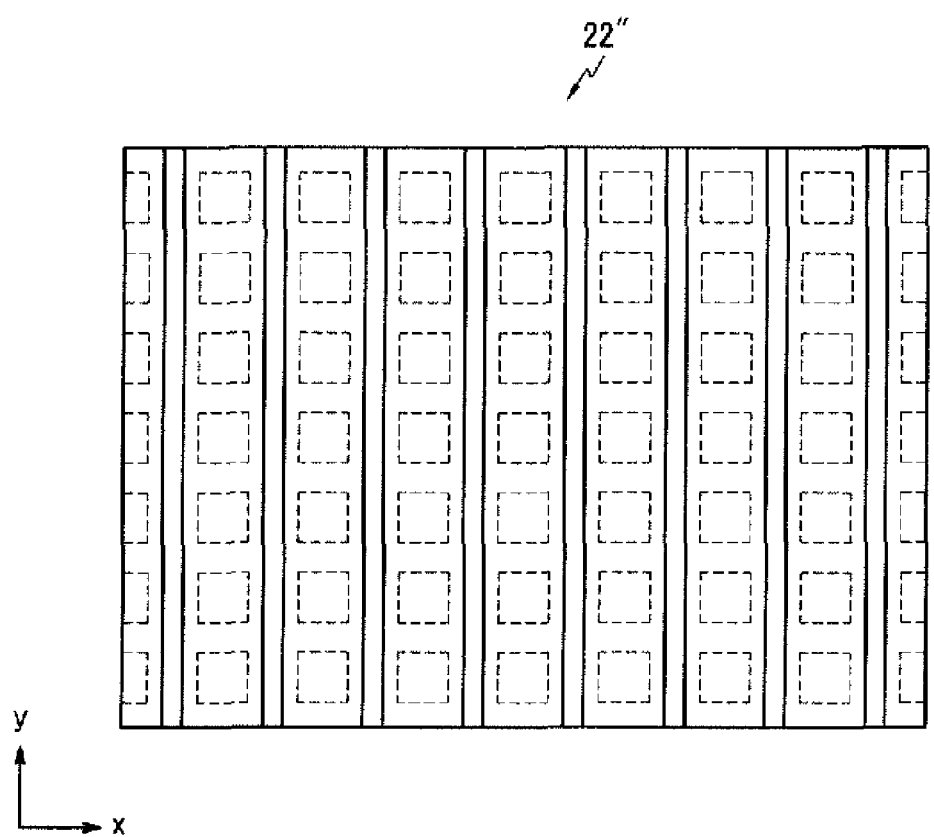
FIGS. 8 and 9 are top plan views of modified examples of a heat dissipation plate.
Figure 9:
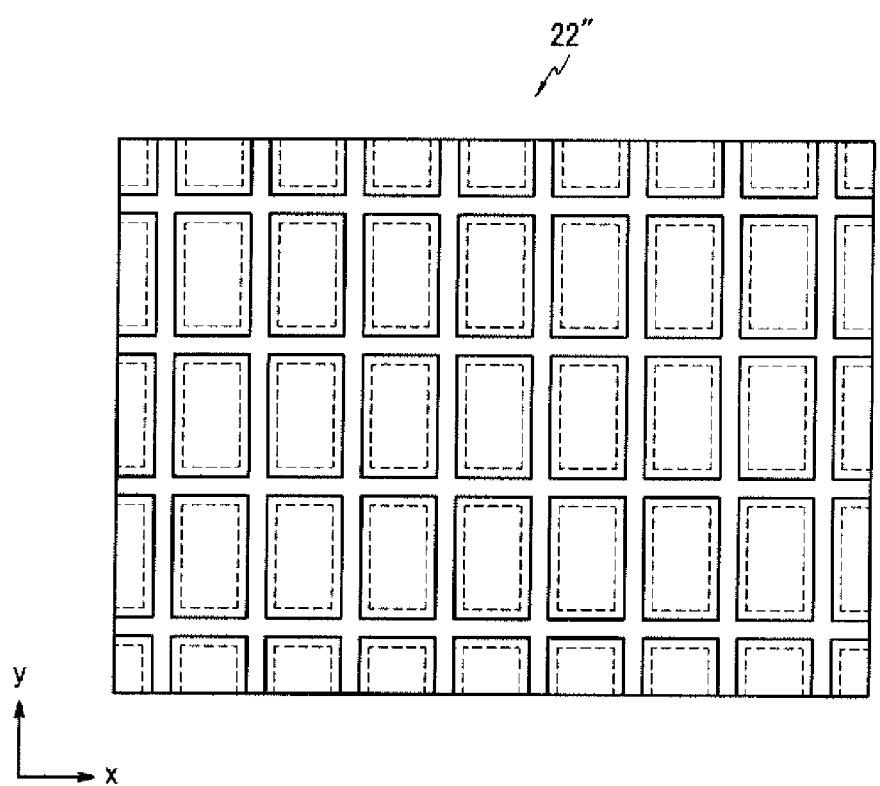

FIGS. 8 and 9 show modified examples of a heat dissipating plate 22". As shown in FIGS. 8 and 9, the heat dissipating plate 22" may be formed in a stripe pattern in which a plurality of stripes are arranged in parallel with each other (FIG. 8) or in a mesh pattern in which the stripes cross each other (FIG. 9). Portions represented by dotted lines in FIG. 8 and FIG. 9 indicate unit pixels. However, the heat dissipation plate is not limited to the above described embodiments and modified examples. The shape of the heat dissipation plate may vary as long as it can allow the light to pass therethrough.

The heat dissipation plates 22', 22" may be formed by depositing a metal material on the second substrate 14 and processing the metal material layer in the above-described patterns. Alternatively, a metal plate that is formed separately may be inserted between the second substrate 14 and the diffuser plate 20.

The light emission devices 100A, 100B, and 100C of the respective foregoing exemplary embodiments may be applied to a display that will be described in more detail below.

Figure 10:
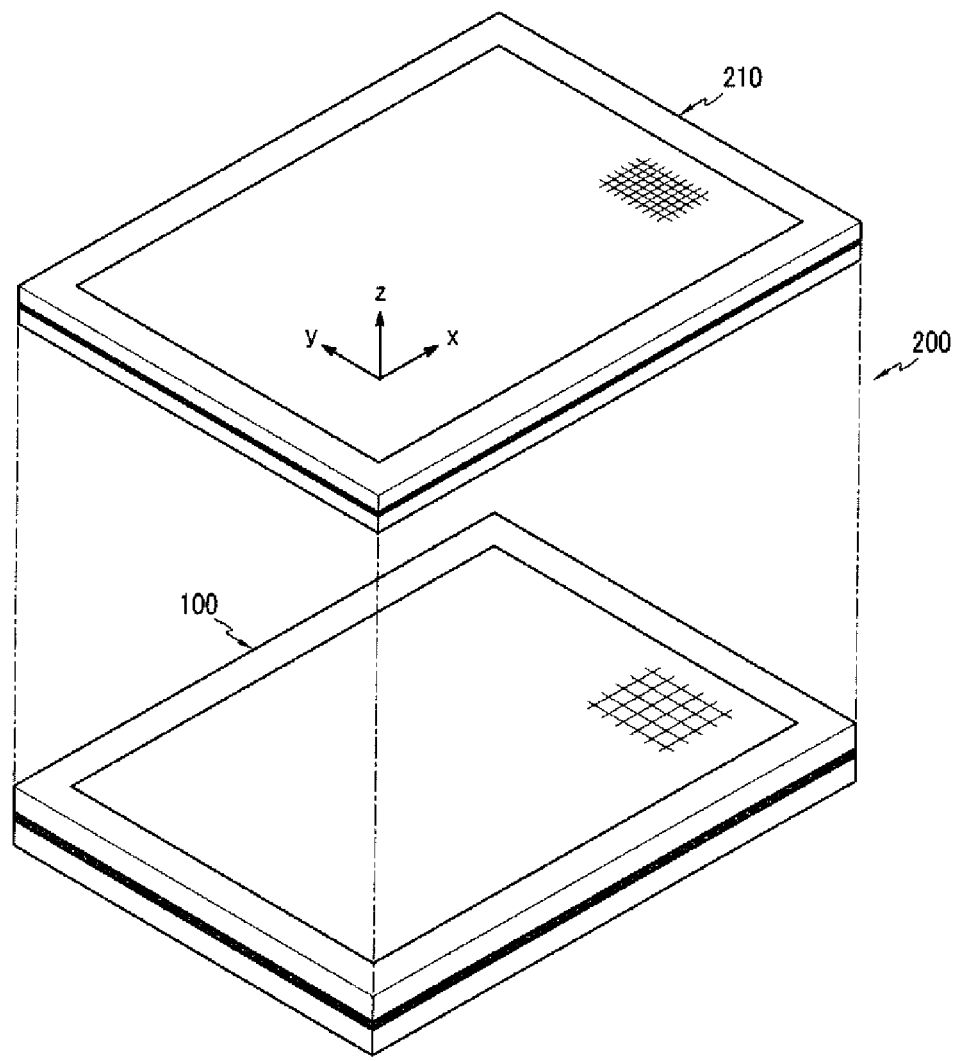
FIG. 10 is an exploded perspective view of a display according to an exemplary embodiment of the present invention.

FIG. 10 shows a display having a light emission device 100 according to an exemplary embodiment of the present invention.

Referring to FIG. 10, a display 200 includes the light emission device 100 and a display panel 210 disposed on the light emission device 100.

The display panel 210 may be a liquid crystal display panel or another type of passive (non-emissive) display panel. In the following description, the display panel 210 is assumed, by way of example, to be a liquid crystal display panel.

The display panel 210 includes a plurality of pixels arranged in rows and columns, and the light emission device 100 is disposed in the rear of the display panel 210 to emit the light toward the display panel 210. The light emission device 100 has a smaller number of pixels than the display panel 210. The pixels of the light emission device 100 are also arranged in rows and columns. For example, one of the pixels of the light emission device 100 may correspond to two or more of the pixels of the display panel 210. Here, the row direction may be an x-direction of the display device 200 and the column direction may be a y-direction of the display device 200. Here, the cathode electrodes (24 in FIG. 3) of the light emission device 100 are formed extending in the column direction and the gate electrodes (28 in FIG. 3) are formed extending in the row direction.

Figure 11:
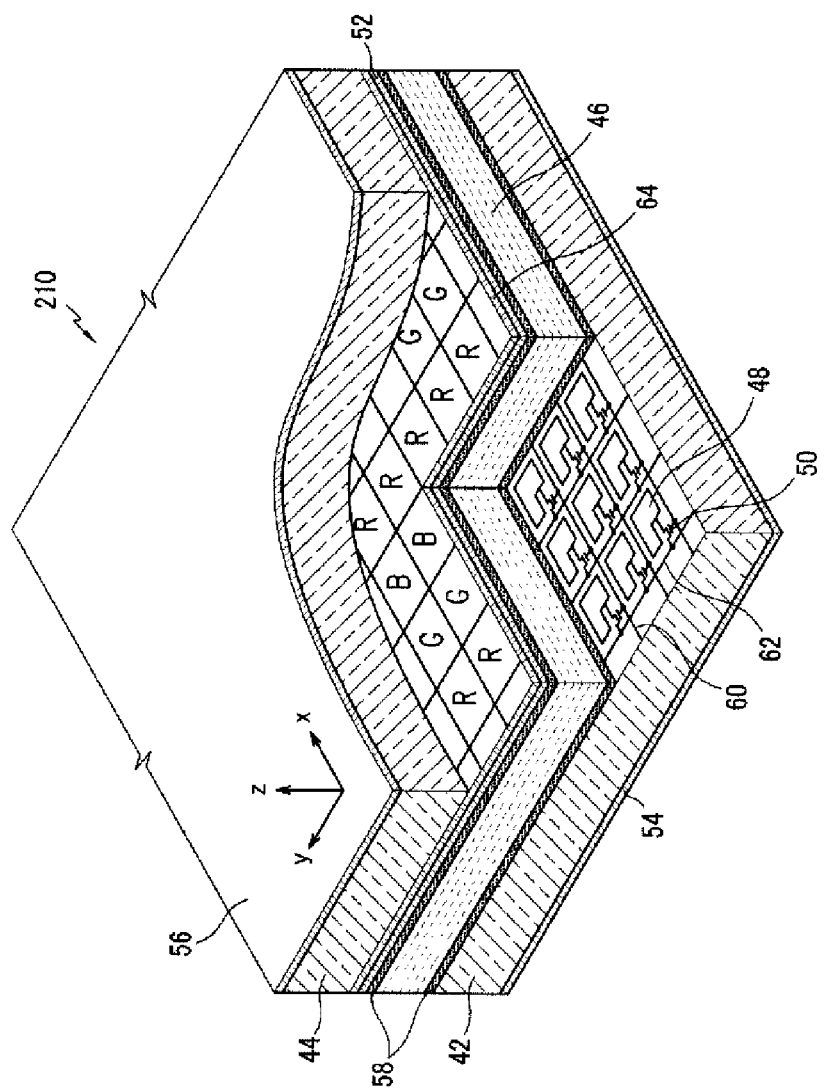
FIG. 11 is a partially cut-away perspective view of a display panel of FIG. 6.

FIG. 11 is a partial sectional view of the display panel 210 of FIG. 10.

Referring to FIG. 11, the display panel 210 includes a transparent third substrate 42, a transparent fourth substrate 44, and a liquid crystal layer 46 disposed between the third and fourth substrates 42 and 44.

Pixel electrodes 48 and switching elements 50 are formed on an inner surface of the third substrate 42 (or on the surface of the third substrate 42 facing the fourth substrate). A common electrode 52 is formed on an inner surface of the fourth substrate 44 (or on the surface of the fourth substrate 44 facing the third substrate 42).

A pair of polarizing plates 54 and 56 are respectively located on outer surfaces of the third and fourth substrates 42 and 44. The polarizing plates 54 and 56 are disposed such that polarizing axes thereof cross each other (e.g., cross each other at right angles). Orientation layers 58 are disposed to face each other with the liquid crystal layer 46 interposed therebetween.

A plurality of gate lines 60 for transferring gate signals (scan signals) and a plurality of data lines 62 for transferring data signals are formed on the inner surface of the third substrate 42. The gate lines 60 extend in the x-direction in parallel with each other, and the data lines 62 extend in the y-direction in parallel with each other.

The pixel electrodes 48 are respectively located at sub-pixels and connected to the gate and data lines 60 and 62 through the switching elements 50.

Disposed between the fourth substrate 44 and the common electrode 52 is a color filter 64. The color filter 64 includes red, green, and blue filters corresponding to the respective sub-pixels. Three of the sub-pixels at which the red, green, and blue filters are respectively located form one unit pixel.

With the above-described display panel 210, when a switching element 50 is turned on, an electric field is formed between a pixel electrode 48 and the common electrode 52 and a twisting angle of liquid crystal molecules located in the liquid crystal layer 46 varies by the electric field. The display panel 210 controls the twisting angle of each of the liquid crystal molecules at each sub-pixel to control an amount of passing light, thereby realizing a color image.

Figure 12:
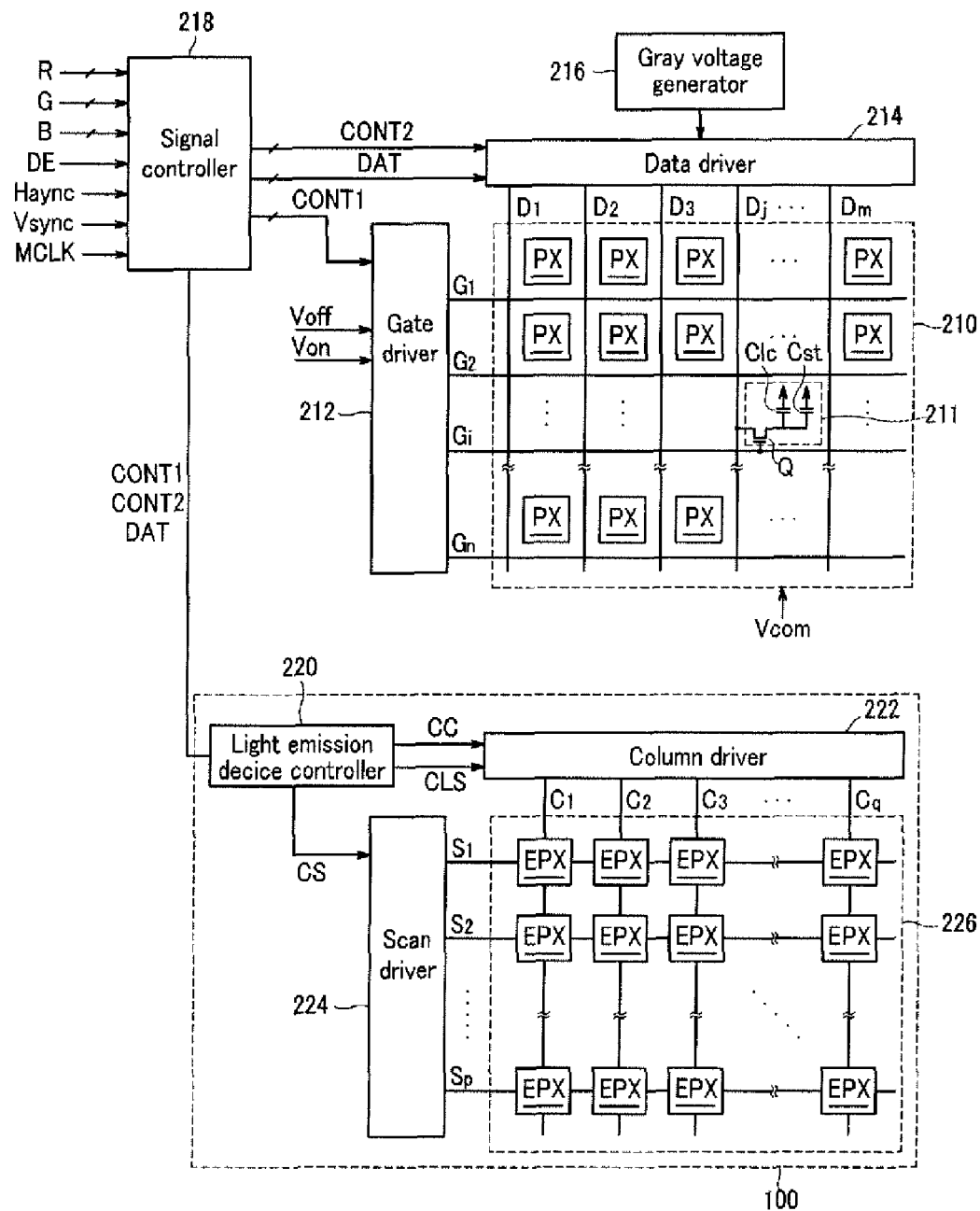
FIG. 12 is a block schematic diagram of a driving part for driving the display of FIG. 10.
Figure 12:
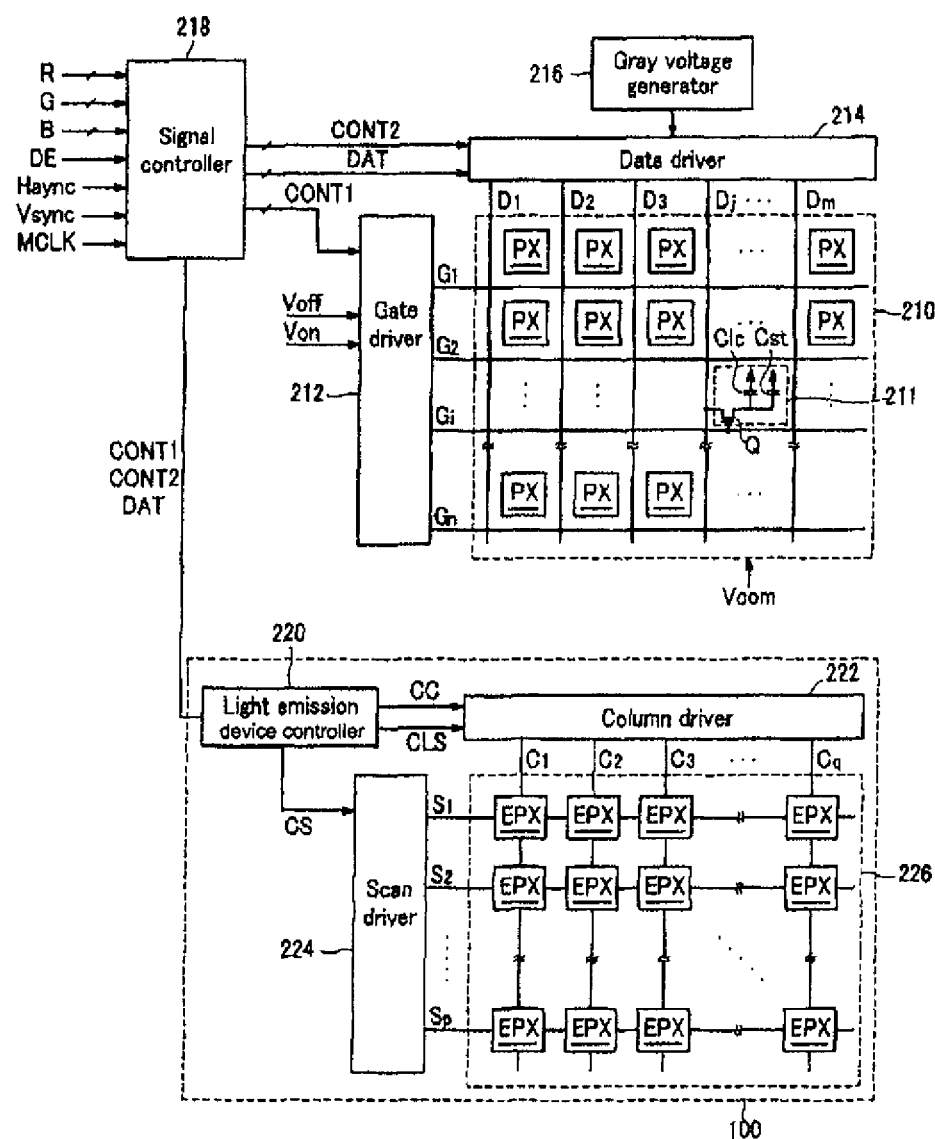

FIG. 12 is a block diagram of a driving part for driving the display 200.

Referring to FIG. 12, a driving part of the display includes gate and data drivers 212 and 214 connected to the display panel 210, a gray voltage generator 216 connected to the data driver 214, and a signal controller 218 for controlling the gate and data drivers 212 and 214 as well as the display panel 210 and the light emission device 100.

When considering the display panel 210 as an equivalent circuit, the display panel 210 includes a plurality of signal lines and a plurality of pixels PX arranged in rows and columns and connected to the signal lines. The signal lines include gate lines $G_1$-$G_n$ for transferring gate signals (scan signals) and data lines $D_1$-$D_m$ for transferring data signals.

Each pixel PX, e.g., a pixel 211 connected to $i^{th}$ (i=1,2, ... n) gate line $G_i$ and $j^{th}$ (j=1,2, ... m) data line $D_j$, includes a switching element Q connected to the gate (or signal) line $G_i$ and the data (or signal) line $D_j$, and liquid crystal and sustain capacitors Clc and Cst connected to the switching element Q. If needed or desired, in another embodiment, the sustain capacitor Cst may be omitted.

The switching element Q is a 3-terminal element such as a thin film transistor (TFT) formed on a lower substrate of the display panel 210. That is, the switching element Q includes a control terminal connected to the gate line $G_i$, an input terminal connected to the data line $D_j$, and an output terminal connected to the liquid crystal and sustain capacitors Clc and Cst.

The gray voltage generator 216 generates two sets of gray voltages (or two sets of reference gray voltages) related to the transmittance of the pixels PX. One of the two sets has a positive value with respect to a common voltage Vcom, and the other has a negative value.

The gate driver 212 is connected to the gate lines $G_1$-$G_n$ of the display panel 210 to apply a gate signal, which is a combination of a switch-on voltage Von and a switch-off voltage Voff, to the gate lines $G_1$-$G_n$.

The data driver 214 is connected to the data lines $D_1$-$D_m$ of the display panel 210. The data driver 214 selects a gray voltage from the gray voltage generator 216 and applies the selected gray voltage to the first data lines $D_1$-$D_m$. However, when the gray voltage generator 216 does not provide all of the voltages for all of the gray levels but provides only a certain (or predetermined) number of reference gray voltages, the data driver 214 divides the reference gray voltages, generates the gray voltages for all of the gray levels, and selects a data signal from the gray voltages.

The signal controller 218 controls the gate driver 212, the data driver 214, and a light emission device controller 220. The signal controller 218 receives input video signals R, G, and B and an input control signal for controlling the display of the image from an external graphics controller.

The input video signals R, G, and B have luminance information for each pixel PX. The luminance information contains information about a certain (or predetermined) number of gray levels (e.g., 1024 (=$2^{10}$), 256 (=$2^8$), or 64 (=$2^6$). The input control signal may be a vertical synchronizing signal Vsync, a horizontal synchronizing signal Hsync, a main clock signal MCLK, and/or a data enable signal DE.

The signal controller 218 appropriately processes the input video signals R, G, and B in response to the operating conditions of the display panel 210 with reference to the input control signal, generates a gate control signal CONT1 and a data control signal CONT2, transmits the gate control signal CONT1 to the first gate driver 212, and transmits the data control signal CONT2 and the processed images signal DAT to the data driver 214. Further, the signal controller 218 transmits the gate control signal CONT1, the data control signal CONT2, and the processed video signal DAT to the light emission device controller 220.

The light emission device 100 includes the light emission device controller 220, a column driver 222, a scan driver 224, and a display unit 226.

The display unit 226 includes a plurality of scan lines $S_1$-$S_p$ for transferring scan signals, a plurality of column lines $C_1$-$C_q$ for transferring column signals, and a plurality of light emission pixels EPX. The light emission pixels EPX are located at respective regions defined by the crossings of the scan lines $S_1$-$S_p$ and the column lines $C_1$-$C_q$. The scan lines $S_1$-$S_p$ are connected to the scan driver 224 and the column lines $C_1$-$C_q$ are connected to the column driver 222. The scan driver 224 and the column driver 222 are connected to the light emission device controller 220 to operate in response to a control signal of the light emission device controller 220.

The scan lines $S_1$-$S_p$ are the scan electrodes of the above-described light emission device, and the column lines $C_1$-$C_q$ are the data electrodes of the above-described light emission device.

The light emission device controller 220 generates a scan driver control signal CS for controlling the scan driver 224 using the gate control signal CONT1 and transfers the scan driver control signal CS. Further, the light emission device controller 220 generates a column driver control signal CC using the data control signal and further generates a column signal CLS corresponding to the video signal DAT. The generated column driver control signal (CC) and column signal (CLS) are transferred to the column driver 222. The light emission device controller 220 generates luminance information for each pixel of the light emission device 100 from a frame of video signal DAT and further generates the column signal CLS in accordance with the generated luminance information.

The scan driver 224 sequentially applies the driving voltages, each having a certain (or predetermined) pulse, to the scan lines $S_1$-$S_p$ in response to the scan driver control signals inputted thereto. The column driver 222 applies driving voltages corresponding to color signals to the column lines $C_1$-$C_q$ in response to the column driver control signals inputted thereto.

With the above-described structure, the display unit 226 of the light emission device 100 receives a driving signal synchronized with the video signal, emits light having proper intensity in response to the luminance information of each pixel, and provides the emitted light to the display panel 210. Each of the light emission pixels EPX of the light emission device 226 may be driven to represent gray levels in gray scale ranging from 2 to 8-bits.

According to the above-described exemplary embodiment, when the display panel 210 displays an image having different brightness at different locations, the light emission device 100 can provide relatively high intensity of light to pixels of the display panel, which display a relatively bright image, and relatively low intensity of light to pixels of the display panel, which display a relatively dark image. In addition, the light emission pixels of the light emission device 100, which correspond to the pixels of the display panel and display a black image, may be turned off.

As a result, the display 200 is able to improve dynamic contrast through the above-described control process.

Since the light emission devices of the foregoing exemplary embodiments are surface (or area) light sources, optical members that are used for the CCFL type of backlight unit and the LED type of backlight unit are not required. Also, the light emission devices of the foregoing exemplary embodiments reduce the light loss that may occur as the light passes through the optical members. Therefore, there is no need to emit high intensity light and thus the power consumption can be reduced.

Further, since optical members are not needed, the manufacturing cost can be reduced to be lower than the LED type of backlight unit.

In addition, since the light emission device can be easily formed to have a relatively large size, it can be applied to a display of greater than 30 inches.

Furthermore, in one embodiment, since the heat dissipation plate is provided between the light emission panel and the display panel, heat can be effectively dissipated while not blocking the light emitted from the light emission panel.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A light emission device, comprising:
a light emission panel comprising a plurality of pixels for emitting light;
a diffuser plate facing the light emission panel to diffuse the light emitted from the light emission panel; and
a heat dissipation plate disposed between the light emission panel and the diffuser plate,
wherein the light emission panel has:
an active area for emitting the light; and
a non-active area around the active area,
wherein the heat dissipation plate has a plurality of apertures for passing through the light emitted from the light emission panel and a non-aperture portion for blocking the light emitted from the light emission panel, and
wherein each of the plurality of apertures is disposed to correspond to at least one corresponding pixel of the plurality of pixels of the light emission panel.

2. The light emission device of claim 1, wherein, when an area occupied by the apertures in the active area is S1 and an area occupied by the non-aperture portion is S2, the following condition is satisfied:

$1 \leq S1/S2 \leq 19$.

3. The light emission device of claim 1, wherein the apertures have a pitch within the active area.

4. The light emission device of claim 1, wherein each of the apertures is disposed to correspond to only one corresponding pixel of the pixels of the light emission panel.

5. The light emission device of claim 1, wherein the heat dissipation plate has a stripe pattern or a mesh pattern.

6. The light emission device of claim 1, wherein the heat dissipation plate is a metal material deposited and patterned on the light emission panel.

7. The light emission device claim 1, wherein the heat dissipation plate comprises a material selected from the group consisting of aluminum, silver, copper, platinum, and combinations thereof.

8. The light emission device of claim 1, wherein the thickness of the heat dissipation plate is between about 0.05 mm and about 10 mm.

9. The light emission device of claim 1, wherein the heat dissipation plate is a molded metal plate.

10. The light emission device of claim 1, wherein the light emission panel comprises:
a first substrate;
a second substrate opposing the first substrate;
a light emission unit on the second substrate to emit light; and
an electron emission unit on the first substrate to emit electrons.

11. The light emission device of claim 10, wherein the electron emission unit comprises:
a cathode electrode on the first substrate;
a plurality of electron emission regions electrically connected to the cathode electrode; and
a gate electrode electrically insulated from the cathode electrode.

12. The light emission device of claim 10, wherein the light emission unit comprises a phosphor layer and an anode electrode on the second substrate, and the anode electrode is adapted to be applied with a voltage ranging from 10 to 20 kV.

13. A display comprising:
a display panel for displaying an image; and
a light emission device for providing light to the display panel,
wherein the light emission device comprises:
a light emission panel comprising a plurality of pixels for emitting light,
a diffuser plate facing the light emission panel to diffuse the light emitted from the light emission panel, and
a heat dissipation plate disposed between the light emission panel and the diffuser plate,
wherein the light emission panel has:
an active area for emitting the light; and
a non-active area around the active area,
wherein the heat dissipation plate has a plurality of apertures for passing through the light emitted from the light emission panel and a non-aperture portion for blocking the light emitted from the light emission panel, and
wherein each of the plurality of apertures is disposed to correspond to at least one corresponding pixel of the plurality of pixels of the light emission panel.

14. The display of claim 13, wherein the display panel comprises a plurality of first pixels arranged in rows and columns, and the light emission device comprises a plurality of second pixels arranged in rows and columns, and wherein the first pixels are greater in number than the second pixels.

15. The display of claim 14, wherein the light emission device is configured to represent gray levels in gray scale ranging from 2 to 8 bits for each pixel.

16. The display of claim 13, wherein the light emission panel comprises:
a first substrate;
a second substrate opposing the first substrate; and
a light emission unit comprising a phosphor layer and an anode electrode on the second substrate, and
wherein the phosphor layer is a white phosphor layer.

* * * * *

UNITED STATES PATENT AND TRADEMARK OFFICE
CERTIFICATE OF CORRECTION

| | | |
|---|---|---|
| PATENT NO. | : 7,884,536 B2 | |
| APPLICATION NO. | : 11/759845 | |
| DATED | : February 8, 2011 | |
| INVENTOR(S) | : Sang-Jin Lee et al. | |

It is certified that error appears in the above-identified patent and that said Letters Patent is hereby corrected as shown below:

In the Drawings

FIG. 12, Sheet 12 of 12    Delete Drawing Sheet 12 and substitute therefore the Drawing Sheet, consisting of FIG. 12, as shown on the attached page.

Delete "decice"
Insert -- device --

In the Claims

Column 11, Claim 7, line 60    After "device" Insert -- of --

Signed and Sealed this
Fourteenth Day of August, 2012

David J. Kappos
*Director of the United States Patent and Trademark Office*